United States Patent Office 3,816,544
Patented June 11, 1974

3,816,544
NOVEL 4,4'-METHYLENEBIS(2,6-DIARALKYL-PHENOLS)
Gordon D. Brindell, Crystal Lake and Rudy (Rudolph) F. Macander, Cary, Ill., assignors to The Quaker Oats Company, Barrington, Ill.
No Drawing. Filed May 15, 1972, Ser. No. 253,342
Int. Cl. C07c 39/16
U.S. Cl. 260—619 A                                9 Claims

ABSTRACT OF THE DISCLOSURE

A new series of compounds having the following formula is disclosed:

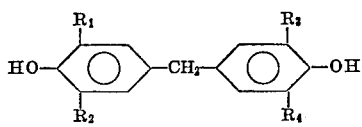

wherein $R_1$, $R_2$, $R_3$, and $R_4$ are aralkyl with the proviso that the aralkyl group contains no branching on the carbon alpha to the phenylene group, said compounds useful to stabilize organic materials normally tending to undergo oxidative deterioration.

BACKGROUND OF THE INVENTION

Field of the invention

This invention relates to a new class of antioxidants.

Description of the prior art

In U.S. Patent No. 3,227,678, the patentee disclosed a class of phenolic compounds having the following formula as stabilizers for polypropylene:

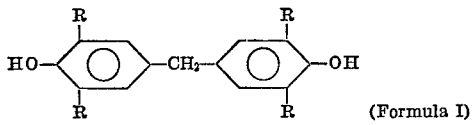

(Formula I)

wherein R is a lower alkyl group having 1 to 6 carbon atoms, which may be primary, secondary, or tertiary. Typical of those compounds were 4,4'-methylenebis(2,6-dimethylphenol), 4,4' - methylenebis(2,6 - diisopropylphenol), and 4,4'-methylenebis(2,6-di-tert-butylphenol).

SUMMARY OF THE INVENTION

The purpose of the present invention is to disclose and claim a class of phenolic compounds which are unexpectedly good antioxidants for polyolefins.

The present invention may be briefly described as a phenolic compound having the following structural formula:

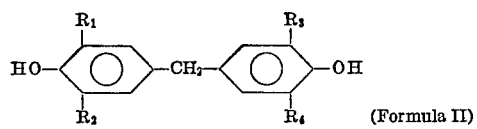

(Formula II)

wherein $R_1$, $R_2$, $R_3$, and $R_4$ are aralkyl with the proviso that the aralkyl groups contain no branching on the carbon alpha to the phenylene group.

By aralkyl in Formula II we are to be understood to mean a group of the following structure:

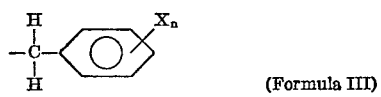

(Formula III)

wherein X is hydrogen, alkyl, alkoxy, or halogen, and n is an integer between 0 and 5.

We prefer that the aralkyl group contains less than 20 carbon atoms. Where the aralkyl group is substituted with halogen, the halogen group may be chloro, bromo, iodo or fluoro for example. When the aralkyl group is substituted with alkyl or alkoxy groups, these groups preferably contain from 1 to 13 carbon atoms which may be straight or branched chain. Suitable aralkyl groups include the following as long as the above mentioned proviso is satisfied: benzyl, ar-chlorobenzyl, ar-bromobenzyl, ar-iodobenzyl, ar-fluorobenzyl, ar-methoxybenzyl, ar-ethoxybenzyl, ar-methylbenzyl, ar-ethylbenzyl, or ar-tert-butylbenzyl. As seen from the above exemplification, "n" in Formula III is preferably 0 or 1.

Examples of specific phenolic compounds within the scope of Formula II and useful in the practice of this invention are the following:

4,4'-methylenebis(2,6-dibenzylphenol);
4,4'-methylenebis[2,6-di(p-chlorobenzyl)phenol];
4,4'-methylenebis[2,6-di(o-chlorobenzyl)phenol];
4,4'-methylenebis[2,6-di(p-methylbenzyql)phenol];
4,4'-methylenebis[2,6-(di(p-ethylbenzyl)phenol];
4,4'-methylenebis[2,6-di(p-methoxybenzyl)phenol];
4,4'-methylenebis[2,6-di(o-ethoxybenzyl)phenol]; and
4,4'-methylenebis[2,6-di(m-methylbenzyl)phenol].

The phenolic compounds of Formula II are prepared according to methods well known in the art by reacting formaldehyde with a phenol of the following formula:

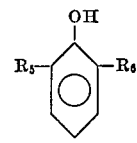

(Formula IV)

wherein $R_5$ and $R_6$ are defined consistent with the $R_1$, $R_2$, $R_3$, and $R_4$ groups in Formula II. Exemplary of such methods is that described in U.S. Pat. No. 2,944,086. All of the suitable phenols are commercially available or prepared by known techniques.

The 4,4'-methylenebis(2,6-diaralkylphenols) of our invention are useful as antioxidants for organic materials normally tending to undergo oxidative deterioration. By organic material normally tending to undergo oxidative deterioration, we mean to include material based in whole or in part on a skeleton comprising interconnected carbon atoms which upon exposure to oxygen or air loses its desirable properties and becomes weak, brittle, cracked, discolored, viscous or the like. Exemplary organic materials are polymers; hydrocarbon liquids, particularly gasoline and lubricating or fuel oils, hydrocarbon solids or semisolids, such as waxes, greases and the like; elastomers, such as natural and synthetic rubber; and feeds or foodstuffs.

Typical polymers include polyolefins, polyurethanes, polyethers, and polyamides. Suitable polyolefins include for example, polystyrene, polyvinyl chloride, polyvinylidene chloride, polyvinyl fluoride, polyvinyl butyral, polymethyl acrylate, ethylene vinyl acetate copolymers, and ethylene propylene terpolymers. Suitable polyethers include for example polyformaldehyde and polytetramethylene ether glycol.

Hydrocarbon liquids stabilized by our novel tetraphenolic derivatives include motor lubricating oils, gear and transmission fluids based on hydrocarbon oils, and the like. Fuel oils, such as furnace oils and light kerosene fractions, including gas turbine fuels, are also stabilized by our compositions.

Solid or semi-solid hydrocarbons, such as wax and grease, are also improved by incorporation therein of the tetraphenolic compounds of this invention.

Such solid polymeric elastomers as natural and synthetic rubber are stabilized against hardening, cracking, and checking with the tetraphenolic derivatives described. Exemplary of natural rubbers is *Hevea brasiliensis*, while synthetic rubbers include styrene-butadient rubber; polybutadiene; polyisoprene; neoprene; butyl rubber; nitrile-butadiene rubbers, styrene-chloroprene rubbers; acrylate-butadiene rubbers; and polyurethane rubber.

The 4,4'-methylenebis(2,6-diaralkylphenols) of this invention are also useful to enhance the stability of the natural fats and oils. For example, the following edible oils can be stabilized with our compositions: shortening, lard, butter, coconut oil, cotton seed oil, soybean oil, palm oil, corn oil, peanut oil, sunflower seed oil, safflower oil, olive oil, and the like or mixtures thereof. These oils may have been treated, as by hydrogenation, interesterification, or fractional crystallization, to modify their melting points.

The 4,4'-methylenebis(2,6-diaralkylphenols) of Formula II are particularly useful with polymers derived from monoolefins having a terminal double bond. Examples of such alpha polyolefins include but are not limited to the following: polyethylene, polypropylene, poly-4-methylpentene-1, poly-1-butene, poly-3-methylbutene-1, and copolymers thereof.

In general, the phenolic compound of Formula II should be used with organic material in an amount effective and sufficient to stabilize the material. The requisite amount will, of course, depend both on the efficiency of the particular phenolic compound and the nature of the organic material to be stabilized. It has been our experience that from 0.01 percent to 10 percent by weight based on the weight of the organic material is sufficient. Amounts down to as little as 0.0001 percent by weight may be effective in some cases.

It is to be understood that the stabilizing effect of the phenolic compounds is considerably enhanced by conventional synergists such as certain sulfides and polysulfides. The synergist is used in conventional amounts. For example, an amount of synergist from about 0.1 percent to about 1 percent by weight of the organic material to be stabilized is satisfactory but we prefer to use from 0.1 percent to 0.5 percent by weight.

As sulfides there may be mentioned dialkylsulfides, particularly wherein the alkyl groups are long chain such as dodecyl groups since the lower dialkylsulfides are too volatile to be effective, di(substituted)-alkylsulfides particularly esters of bis-carboxyalkyl sulfides such as dilauryl, distearyl, ditridecyl, or dioctadecyl thiodipropionates or thiodibutyrates, dibenzylsulfide such as bis(2-hydroxy-5-methylbenzyl)sulfide and bis(3-*tert*-butyl-2-hydroxy-5-methoxybenzyl)sulfide, diaryl sulfide, sulfides such as diphenyl sulfide, dicresyl sulfide, 2,2'-dihydroxy-5,5'-dimethyl diphenyl sulfide, diphenyldisulfide, dialkyl-dithiophosphates such as bis(diisopropyldithiophosphoryl) disulfide, and dialkyldithiophosphatomethylphenols.

It will further be understood that the organic material in addition to containing a stabilizing amount of the phenolic compound and a synergist may contain such other ingredients as other antioxidants, coloring agents, fillers, curing agents, etc.

DESCRIPTION OF THE PREFERRED EMBODIMENTS

The following embodiments of this invention are shown for the purpose of illustrating the invention and demonstrate the best mode for practicing the invention. It will be apparent to those skilled in the art that various changes and modifications may be made therein without departing from the spirit and scope of the invention as it is more precisely defined in the subjoined claims.

Example 1

In a reaction vessel equipped with a stirrer, condenser, thermometer, and dropping funnel, was placed a solution of 17 g. of paraformaldehyde and 278 g. of 2,6-di-*p*-methylbenzylphenol in 500 g. of ethanol. To this stirred solution maintained under a nitrogen atmosphere at 40° C. was added sulfuric acid in a dropwise manner until 250 g. had been added. The mixture was stirred for 1½ hours, cooled, and the solid filtered off. The product was washed with water, filtered, recrystallized from ethanol, and dried. After drying the product which was 4,4'-methylenebis(2,6-di-*p*-methylbenzylphenol) was obtained in 83 percent yield and had a melting point of 123–124° C.

Example 2

Using the equipment of Example 1, 105 ml. of sulfuric acid was admixed with 210 ml. of ethanol. To this stirred solution maintained under a nitrogen atmosphere and at a temperature of 30° C. was added 7 g. of paraformaldehyde. At a temperature of about 50° C. a mixture of 105 g. of 2,6-dibenzylphenol in 60 ml. of ethanol was added to the above stirred solution. The total admixture was maintained under a nitrogen atmosphere at about 45–50° C. for about an hour. The admixture was cooled and the solid filtered off. The product was washed with water, filtered, and air dried. The dried product was extracted with *n*-hexane, filtered, and recrystallized from ethanol. The product was 4,4'-methylenebis(2,6-dibenzylphenol) which had a melting point of 100–102° C.

Example 3

Using the equipment of Example 1, 200 ml. of sulfuric acid was admixed with 400 ml. of ethanol. To this stirred solution maintained under a nitrogen atmosphere at 20–25° C. was added a mixture of 36 g. of paraformaldehyde and 636 g. of 2,6-di(2"-ethylhexyl)phenol. The reaction mixture was maintained under a nitrogen atmosphere at 20–25° C. overnight. Then the reaction mixture was extracted with 2 liters of n-hexane and 2 liters of water. The water was separated from the *n*-hexane fraction and the *n*-hexane fraction washed with 800 ml. of water. The water was again separated from the *n*-hexane fraction and the fraction was dried with $MgSO_4$. The $MgSO_4$ was removed by filtration from the *n*-hexane fraction and the *n*-hexane was stripped from the crude product. The unreacted 2,6-di(2"-ethylhexyl)phenol was removed from the crude product by distillation under a reduced pressure of 0.18 mm. of Hg at temperatures up to 240° C. The product was 4,4'-methylenebis[2,6-di(2"-ethylhexyl)phenol].

Example 4

Following the procedure of Example 2 but using two moles of 2,6-di(*p*-methoxybenzyl)phenol in place of the two moles of 2,6-dibenzylphenol, 4,4'-methylenebis[2,6-di(*p*-methoxybenzyl)phenol] was prepared.

Example 5

Following the procedure of Example 3 but substituting two moles of 2,6-diisobutylphenol for the two moles of 2,6-di(2"-ethylhexyl)phenol, 4,4' - methylenebis(2,6-diisobutylphenol) was prepared.

Example 6

The performance of several phenolic compounds as antioxidants for polypropylene was determined in the following tests:

In Test 1 an 80 g. sample of Hercules Pro-Fax 6501 polypropylene powder was mixed in a Brabender Plasticorder in which the mixing chamber was heated to about 200° C. The material was mixed for 5 to 10 minutes until the polypropylene had a workable consistency. A sample of the material was then removed and molded into a 5 mil film. The one-inch diameter circles of the film were cut out and put into an oven maintained at 140° C. After 1 hour in the oven, the sample crumbled.

In Test 2, 0.24 g. of dilaurylthiodipropionate was mixed with the 80 g. of polypropylene powder and a sample tested for heat aging as in Test 1. The sample lasted for 70 hours before it crumbled.

The procedure of Test 1 was repeated in Test 3 except that 0.08 g. of 4,4'-methylenebis(2,6-di-*tert*-butylphenol) was added to the polypropylene powder. A 5 mil film sample tested as in Test 1 lasted for 16 hours before crumbling.

Test 4 was conducted like Test 2 except that 0.08 g. of 4,4'-methylenebis(2,6-di-*tert*-butylphenol) was also incorporated into the polypropylene powder. The sample from this test lasted for 211 hours.

Test 5 was conducted similarly to Test 1 except that 0.08 g. of 4,4'-methylenebis[2,6-di(2''-ethylhexyl)phenol] prepared in Example 3 was added to the polypropylene powder. The sample lasted for 16 hours.

In test 6 the procedure of Test 2 was repeated except that 0.08 g. of 4,4'-methylenebis[2,6-di(2''-ethylhexyl)phenol] prepared in Example 3 was also added to the polypropylene powder. The sample in this test lasted for 691 hours.

Test 7 was conducted like Test 1 except that 0.08 g. of 4,4'-methylenebis(2,6-diisobutylphenol) prepared in Example 5 was added to the polypropylene powder. The sample film from this test lasted 40 hours.

The method of Test 2 was repeated in Test 8 except that 0.08 g. of 4,4'-methylenebis(2,6-diisobutylphenol) prepared in Example 5 was also added to the polypropylene powder. The sample lasted for 40 hours.

The procedure of Test 1 was repeated in Test 9 except that 0.08 g. of 4,4'-methylenebis(2,6-dibenzylphenol) prepared in Example 2 was added to the polypropylene powder. A 5 mil sample tested as in Test 1 lasted for 73 hours before crumbling.

Test 10 was conducted like Test 2 except that 0.08 g. of 4,4'-methylenebis(2,6-dibenzylphenol) was also incorporated into the polypropylene powder. A sample from this test lasted for 837 hours before crumbling.

Test 11 was prepared like Test 1 except that 0.08 g of 4,4' - methylenebis[2,6 - di(*p*-methylbenzyl)phenol] was added to the polypropylene powder. The film from this test lasted 103 hours before crumbling.

Test 12 was conducted like Test 2 except that 0.08 g. of 4,4'-methylenebis[2,6-di(*p*-methylbenzyl)phenol] was also incorporated into the polypropylene powder. A sample from this test lasted 915 hours before crumbling.

Example 7

4,4'-Methylenebis[2,6 - di(2''-ethylhexyl)phenol] from Example 3 and 4,4'-methylenebis(2,6-di-*tert*-butylphenol) were evaluated in this example as antioxidants for turbine oil. A modification of ASTM D943–IP157 was used. The following modifications were made: 15 inches of electrolytic copper wire No. 14 Brown and Sharpe gage and 15 inches of low-metalloid steel wire No. 16 Washburn and Moen gage were used to wind the mandrel; 150 ml. of an unstabilized base oil provided by American Oil Company was used; oil temperature was held at 150° C. during the test; and air was substituted for oxygen.

In Test 13, 0.63 g. of 4,4'-methylenebis(2,6-di-*tert*-butylphenol) was added to the oil. Every 24 hours a 5–10 g. sample of oil was removed from the oil tube. The acid number (mg. KOH/g. sample) of the sample was determined and the time required to reach an acid number of 2.0 was determined. In this test it took 5 days for the acid number to reach 2.0.

Following the above procedure in Test 14 the effectiveness of 4,4'-methylenebis[2,6-di(2''-ethylhexyl)phenol] in place of the 4,4'-methylenebis(2,6-di-*tert*-butylphenol) as a stabilizer for turbine oil was determined. In this test it took 2 days for the acid number of the oil to reach 2.0.

Test 15 was conducted like Test 13 except that 4,4'-methylenebis(2,6-dibenzylphenol) was used in place of the 4,4'-methylenebis(2,6-di-*tert*-butylphenol). In this test it took 2 days for the acid number of the oil to reach 2.0.

The above Examples clearly demonstrate the accomplishment of this invention. Examples 3 and 5 are preparations of 4,4'-methylenebis(2,6-dialkylphenols) useful for comparison with the 4,4'-methylenebis(2,6-diaralkylphenols) prepared in Examples 1, 2, and 4. Examples 1, 2, and 4 demonstrate the best mode for preparing the 4,4'-methylenebis(2,6-diaralkylphenols) of Formula II.

The above examples clearly demonstrate the accomplishment of this invention. Examples 1–3 demonstrate our preferred method for obtaining the phenolic compounds useful in our invention.

In Example 6 a comparison of Tests 9 and 11 with Tests 3, 5, and 7 clearly demonstrates the unexpected superiority of phenolic compounds of Formula II as antioxidants in polypropylene over 4,4'-methylenebis(2,6-dialkylphenols). This superiority is even better demonstrated by a comparison of Tests 10 and 12 with Tests 4, 6, and 8 wherein a conventional synergist is used with the antioxidant. Tests 1–8 inclusive are not embodiments of our invention but were prepared for the purposes of comparison with Tests 9–12 inclusive.

In Example 7 a comparison of Test 15 with Tests 13 and 14 shows that phenolic compounds of Formula II do not distiguish themselves as antioxidants in turbine oils in comparison with 4,4' - methylenebis(2,6-dialkylphenols). Tests 13 and 14 are not embodiments of our invention but were prepared to compare with the results of Example 4. The excellent ability of phenolic compounds of Formula II to stabilize polypropylene in Example 6 as compared to that of 4,4' - methylenebis(2,6-dialkylphenols) is unexpected in view of their lackluster performance in Example 7 in turbine oil.

From the foregoing description we consider it to be clear that the present invention contributes a substantial benefit to the antioxidant art by providing a new and useful antioxidant for organic materials normally tending to undergo oxidative deterioration.

We claim:

1. A composition of the formula:

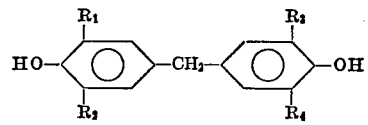

wherein $R_1$, $R_2$, $R_3$ and $R_4$ are aralkyl groups of the following structure:

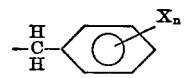

where X is halogen or alkyl containing from 1 to 13 carbon atoms, and wherein $n$ is an integer from 0 to 5.

2. The composition of claim 1 wherein the aralkyl group contain less than 20 carbon atoms.

3. The composition of claim 1 which is 4,4'-methylenebis[2,6-di(*o*-chlorobenzyl)phenol].

4. The composition of claim 1 which is 4,4'-methylenebis[2,6-di(*p*-chlorobenzyl)phenol].

5. A composition of the formula:

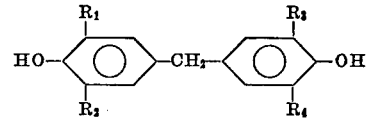

wherein $R_1$, $R_2$, $R_3$ and $R_4$ are aralkyl groups of the following structure:

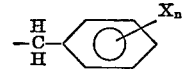

wherein X is halogen or alkyl containing from 1 to 13 carbon atoms and $n$ is 0 or 1.

6. 4,4'-methylenebis(2,6-dibenzyl)-phenol.

7. 4,4'-methylenebis[2,6-di(*p*-methylbenzyl)phenol].

8. 4,4'-methylenebis[2,6 - di(m-methylbenzyl)phenol].
9. A composition of the formula:
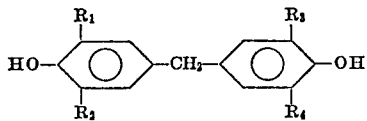
wherein $R_1$, $R_2$, $R_3$ and $R_4$ are aralkyl groups of the following structure:
wherein X is alkyl containing from 1 to 13 carbon atoms and $n$ is 0 or 1.
References Cited
UNITED STATES PATENTS
2,905,737  9/1955  Webb _____ 260—619 A
LEON ZITVER, Primary Examiner
N. MORGENSTERN, Assistant Examiner
U.S. Cl. X.R.
99—150, 163; 252—52 R, 54; 260—45.95, 613 R, 814